United States Patent
Cohen et al.

(10) Patent No.: US 10,168,708 B2
(45) Date of Patent: Jan. 1, 2019

(54) WIRELESS VEHICLE-TRAILER INTERFACE SYSTEM

(71) Applicant: GM GLOBAL TECHNOLOGY OPERATIONS LLC, Detroit, MI (US)

(72) Inventors: Daniel T. Cohen, West Bloomfield, MI (US); Nadav Lavi, Ramat-Hasharon (IL); Kobi Scheim, Pardess Hanna (IL); Andrew R. Camden, Royal Oak, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 19 days.

(21) Appl. No.: 15/474,834

(22) Filed: Mar. 30, 2017

(65) Prior Publication Data

US 2018/0284781 A1 Oct. 4, 2018

(51) Int. Cl.
| | |
|---|---|
| *G05D 1/00* | (2006.01) |
| *G05D 1/02* | (2006.01) |
| *B60W 10/04* | (2006.01) |
| *B60W 10/20* | (2006.01) |
| *B60W 30/18* | (2012.01) |
| *B60W 50/14* | (2012.01) |

(Continued)

(52) U.S. Cl.
CPC ........... *G05D 1/0212* (2013.01); *B60W 10/04* (2013.01); *B60W 10/184* (2013.01); *B60W 10/20* (2013.01); *B60W 30/18036* (2013.01); *B60W 50/14* (2013.01); *G01S 13/765* (2013.01); *G05D 1/0088* (2013.01); *G05D 1/028* (2013.01); *G05D 1/0231* (2013.01); *B60W 2050/146* (2013.01); *B60W 2400/00* (2013.01); *B60W 2420/42* (2013.01); *B60W 2600/00* (2013.01); *G05D 2201/0213* (2013.01)

(58) Field of Classification Search
CPC .... G05D 1/0212; G05D 1/028; G05D 1/0088; G05D 2201/0213; G01S 13/765; B60W 30/18036; B60W 10/20; B60W 2050/146; B60W 2600/00
See application file for complete search history.

(56) References Cited

U.S. PATENT DOCUMENTS

| | | | | |
|---|---|---|---|---|
| 6,480,104 B1* | 11/2002 | Wall | ................. | B60D 1/36 |
| | | | | 280/477 |
| 7,142,098 B2* | 11/2006 | Lang | ................. | B60D 1/62 |
| | | | | 340/431 |

(Continued)

*Primary Examiner* — Michael J Zanelli
(74) *Attorney, Agent, or Firm* — Lorenz & Kopf, LLP

(57) ABSTRACT

A wireless vehicle-trailer interface system for communication between a vehicle and a trailer is provided. The vehicle may include a vehicle hitch, a vehicle control system, a vehicle radio frequency system, and a processor, the processor configured to generate a unique data packet for each vehicle radio frequency system, determine, for each received response packet, a distance between a corresponding receiving vehicle radio frequency system and a corresponding transmitting trailer radio frequency systems, determine a relative physical position of each vehicle radio frequency system and trailer radio frequency system, determine dimensions of the trailer, determine a physical position of a vehicle hitch and a trailer coupled, and generate instructions for the vehicle control system to cause the vehicle to move to align the vehicle hitch with a trailer coupler.

19 Claims, 6 Drawing Sheets

(51) Int. Cl.
*G01S 13/76* (2006.01)
*B60W 10/184* (2012.01)

(56) References Cited

U.S. PATENT DOCUMENTS

| | | | |
|---|---|---|---|
| 2010/0013188 A1* | 1/2010 | Ortmann | B60D 1/36 |
| | | | 280/477 |
| 2015/0321666 A1 | 11/2015 | Talty et al. | |
| 2015/0381859 A1* | 12/2015 | Cover | H04N 5/2252 |
| | | | 348/374 |
| 2017/0254873 A1* | 9/2017 | Koravadi | G01S 3/74 |

* cited by examiner

500

WIRELESS VEHICLE-TRAILER INTERFACE SYSTEM

The present invention generally relates to a vehicle, and more particularly relates to a system and method for communicating between a vehicle and a trailer.

Vehicles often utilize a wiring harness to communicate with a trailer. However, when the vehicle is not yet connected to the trailer, the wiring harness is not available to establish communications.

Accordingly, it is desirable to utilize a wireless interface to communicate between a vehicle and a trailer. In addition, it is desirable to leverage the wireless interface to perform additional tasks. Furthermore, other desirable features and characteristics of the present invention will become apparent from the subsequent detailed description of the invention and the appended claims, taken in conjunction with the accompanying drawings and the background of the invention.

SUMMARY

In one embodiment, for example, a vehicle is provided. The vehicle may include, but is not limited to, a vehicle hitch, at least one vehicle control system, at least one vehicle radio frequency system comprising a transceiver, a processor communicatively coupled to the at least one vehicle radio frequency system and the at least one vehicle control system, the processor configured to generate a unique data packet for each of the at least one vehicle radio frequency system, generate an instruction for each of the at least one vehicle radio frequency system to transmit the unique packet associated with the respective at least one vehicle radio frequency system, receive, from each of the at least one vehicle radio frequency system, a distance between a corresponding receiving one of the at least one vehicle radio frequency system and a corresponding transmitting one of the at least one trailer radio frequency systems based upon a time in flight of the corresponding transmitted unique packet and a corresponding response packet transmitted by the trailer radio frequency system, determine a relative physical position of each of the at least one vehicle radio frequency system and each of the at least one trailer radio frequency system based upon the determined distance, determine a physical position of the vehicle hitch relative to a trailer coupler based upon the determined relative physical position of each of the at least one vehicle radio frequency system and each of the at least one trailer radio frequency system, and generate instructions for the at least one vehicle control system to cause the vehicle to move to align the vehicle hitch with a trailer coupler of the trailer.

In another embodiment, for example, a vehicle is provided. The vehicle may include, but is not limited to, at least one vehicle radio frequency system comprising a transceiver, a processor communicatively coupled to the at least one vehicle radio frequency system, the processor configured to generate a unique data packet for each of the at least one vehicle radio frequency system, generate an instruction for each of the at least one vehicle radio frequency system to transmit the unique packet associated with the respective at least one vehicle radio frequency system, receive, from each of the at least one vehicle radio frequency system, at least one response packet transmitted from at least one trailer radio frequency system corresponding to a trailer, determine, for each received response packet, a distance between a corresponding receiving one of the at least one vehicle radio frequency system and a corresponding transmitting one of the at least one trailer radio frequency systems based upon a time in flight of the corresponding transmitted unique packet and the corresponding response packet, determine a relative physical position of each of the at least one vehicle radio frequency system and each of the at least one trailer radio frequency system based upon the determined distance, and determine, based upon the determined relative physical position of each of the at least one vehicle radio frequency system and each of the at least one trailer radio frequency system, dimensions of the trailer.

In another embodiment, for example, a wireless vehicle-trailer interface system for communication between a vehicle and a trailer is provided. The wireless vehicle-trailer interface system may include, but is not limited to, a vehicle hitch, at least one vehicle control system, at least one vehicle radio frequency system comprising a first transceiver, a first processor communicatively coupled to the at least one vehicle radio frequency system and the at least one vehicle control system, the first processor configured to generate a unique data packet for each of the at least one vehicle radio frequency system, generate an instruction for each of the at least one vehicle radio frequency system to transmit the unique packet associated with the respective at least one vehicle radio frequency system, receive, from each of the at least one vehicle radio frequency system, at least one response packet transmitted from at least one trailer radio frequency system corresponding to a trailer, determine, for each received response packet, a distance between a corresponding receiving one of the at least one vehicle radio frequency system and a corresponding transmitting one of the at least one trailer radio frequency systems based upon a time in flight of the corresponding transmitted unique packet and the corresponding response packet, determine a relative physical position of each of the at least one vehicle radio frequency system and each of the at least one trailer radio frequency system based upon the determined distance, determine, based upon the determined relative physical position of each of the at least one vehicle radio frequency system and each of the at least one trailer radio frequency system, dimensions of the trailer, determine a physical position of the vehicle hitch relative to each of the at least one vehicle radio frequency system and each of the at least one trailer radio frequency system, and generate instructions for the at least one vehicle control system to cause the vehicle to move to align the vehicle hitch with a trailer coupler of the trailer.

BRIEF DESCRIPTION OF THE DRAWINGS

The present invention will hereinafter be described in conjunction with the following drawing figures, wherein like numerals denote like elements.

DETAILED DESCRIPTION

The following detailed description is merely exemplary in nature and is not intended to limit the invention or the application and uses of the invention. Furthermore, there is no intention to be bound by any theory presented in the preceding background or the following detailed description.

Figure 1:
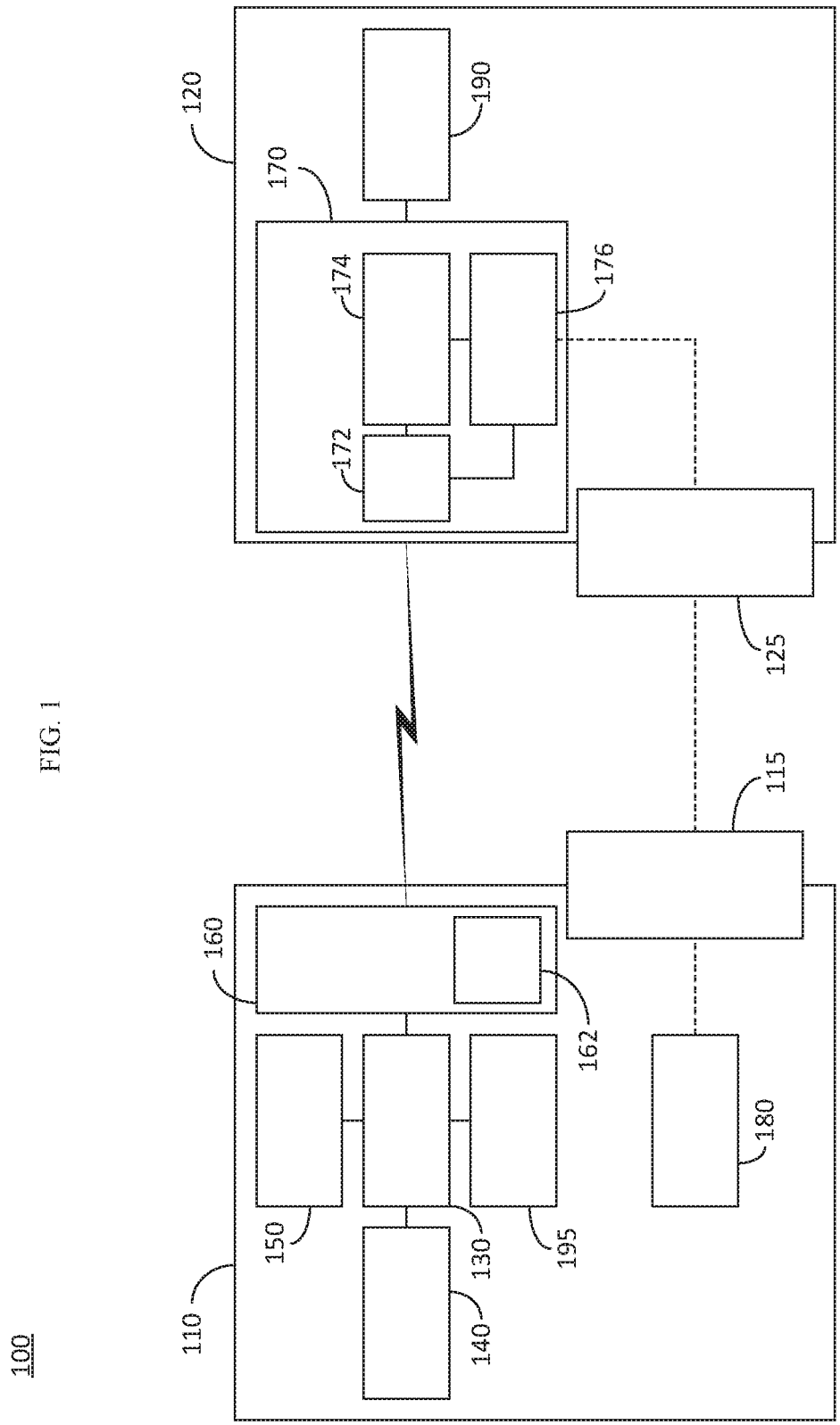
FIG. 1 is a block diagram of a wireless vehicle-trailer interface system, in accordance with an embodiment.

FIG. 1 is a block diagram of a wireless vehicle-trailer interface system 100, in accordance with an embodiment. The wireless vehicle-trailer interface system 100, hereinafter referred to as system 100, includes a vehicle 110 and a trailer 120. The vehicle 110 may be, for example, a truck, a sports utility vehicle (SUV), a car, a semi-truck, or any other vehicle capable of being connected to a trailer. The trailer 120 may be for example, a utility trailer, an animal trailer, a recreational trailer, a boat trailer, a tractor trailer, or the like. The vehicle 110 includes a vehicle hitch 115. Likewise, the trailer 120 includes a corresponding trailer coupler 125 which allows the vehicle 110 to be connected to the trailer 120. The vehicle hitch 115 and trailer coupler 125 may be, for example, a clutch/topper system, a fifth wheel system, a gooseneck system, or the like.

The vehicle 110 includes at least one processor 130. The at least one processor 130 in the vehicle 110 may be a central processing unit (CPU), a graphics processing unit (GPU), a physics processing unit (PPU), a microcontroller, an field programmable gate array (FPGA), an application specific integrated circuit (ASIC), or any other logic device, or any combination thereof. The at least one processor 130, hereinafter referred to as a singular "processor 130" for the sake simplicity, may be dedicated to the system 100 or may be shared by one or more other systems in the vehicle 110.

The vehicle 110 further includes one or more vehicle control systems 140. The one or more vehicle control systems 140 may include, but are not limited to, a steering system, a braking system, an acceleration system, a gear selection system, a vision system, an alert system, or the like. As discussed in further detail below, the processor 130 may generate commands for the one or more vehicle control systems 140 in order to automatically move the vehicle 110, for example, into a position such that the vehicle 110 is aligned with the trailer 120 to connect the vehicle hitch 115 to the trailer coupler 125.

The vehicle 110 further includes a memory 150. The memory 150 may be any combination of volatile and non-volatile memory. The memory 150 may store non-transitory computer readable instructions for implementing the system 100, as discussed in further detail below.

The vehicle 110 includes at least one radio frequency (RF) system 160, each RF system 160 including at least one ultra-wideband (UWB) transceiver 162. Likewise, the trailer 120 includes at least one RF system 170, the RF system 170 including at least one UWB transceiver 172. As discussed in further detail below, the RF system 160 of the vehicle 110 and the RF system 170 of the trailer 120 exchange data so that the processor 130 of the vehicle can generate the commands to automatically move the vehicle 110 into a position such that the vehicle 110 is aligned with the trailer 120 to connect the vehicle hitch 115 to the trailer coupler 125. The processor 130, based upon the data exchange between the RF systems 160 and 170, may also determine dimensions of the trailer or exchange other data, as discussed in further detail below.

Figure 2:
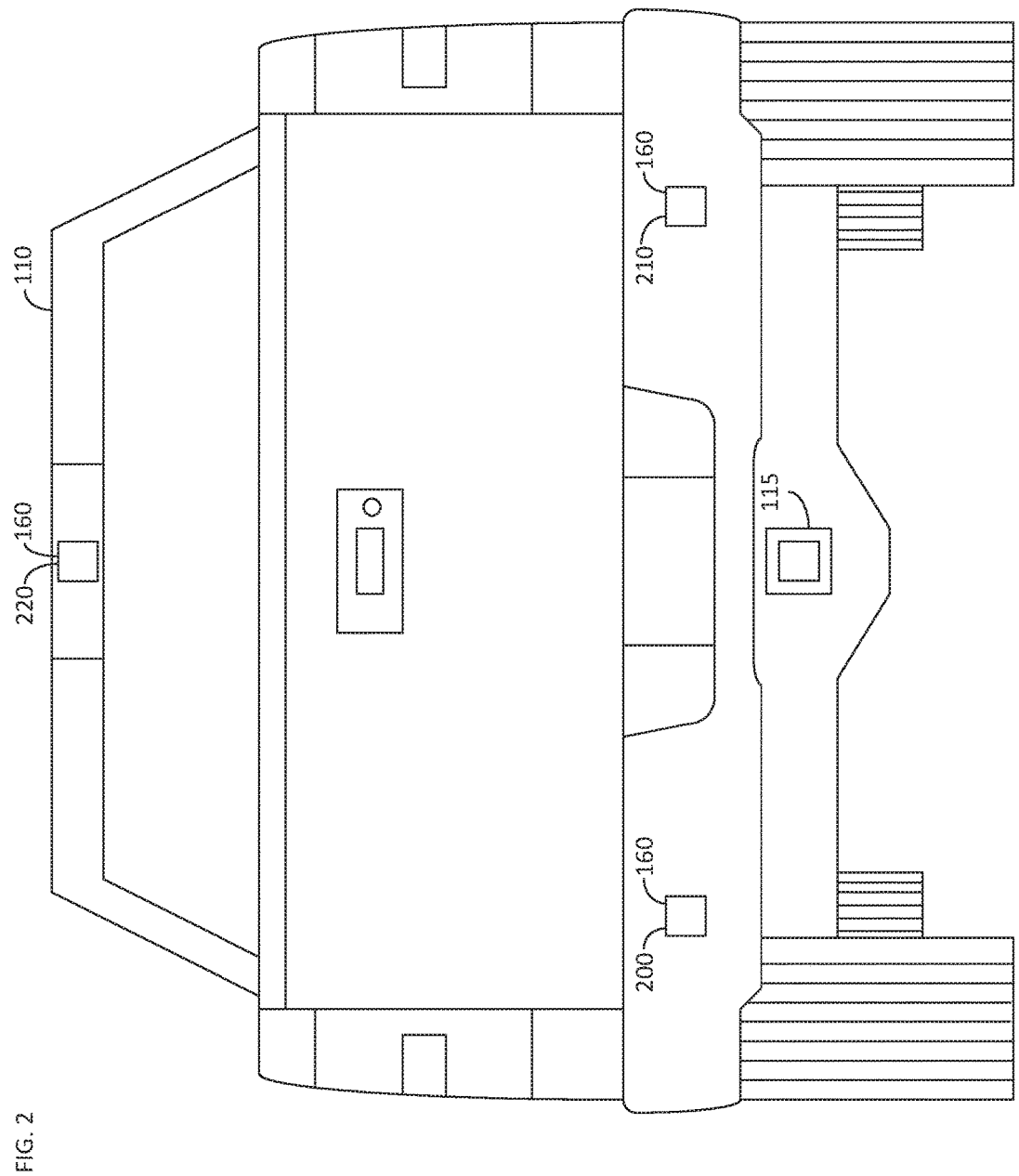
FIG. 2 is a line drawing of a rear end of an exemplary vehicle, in accordance with an embodiment.

FIG. 2 is a line drawing of a rear end of an exemplary vehicle 110, in accordance with an embodiment. In the embodiment illustrated in FIG. 2, three RF systems 160 are located at the rear end of the vehicle. Two RF systems 200 and 210 are located on the bumper of the vehicle 110. In the embodiment illustrated in FIG. 2, another RF system 220 is located within a brake light unit. However, as discussed herein, the number of RF systems 160 and the locations on the vehicle 110 where the RF systems are arranged can vary. For example, RF systems 160 may be located next to a license plate, next to a trunk handle, next to or on the vehicle hitch 115, or any other location on the vehicle that has sufficient exposure to the outside such that signals can propagate from the RF system 160 without degradation.

Figure 3:
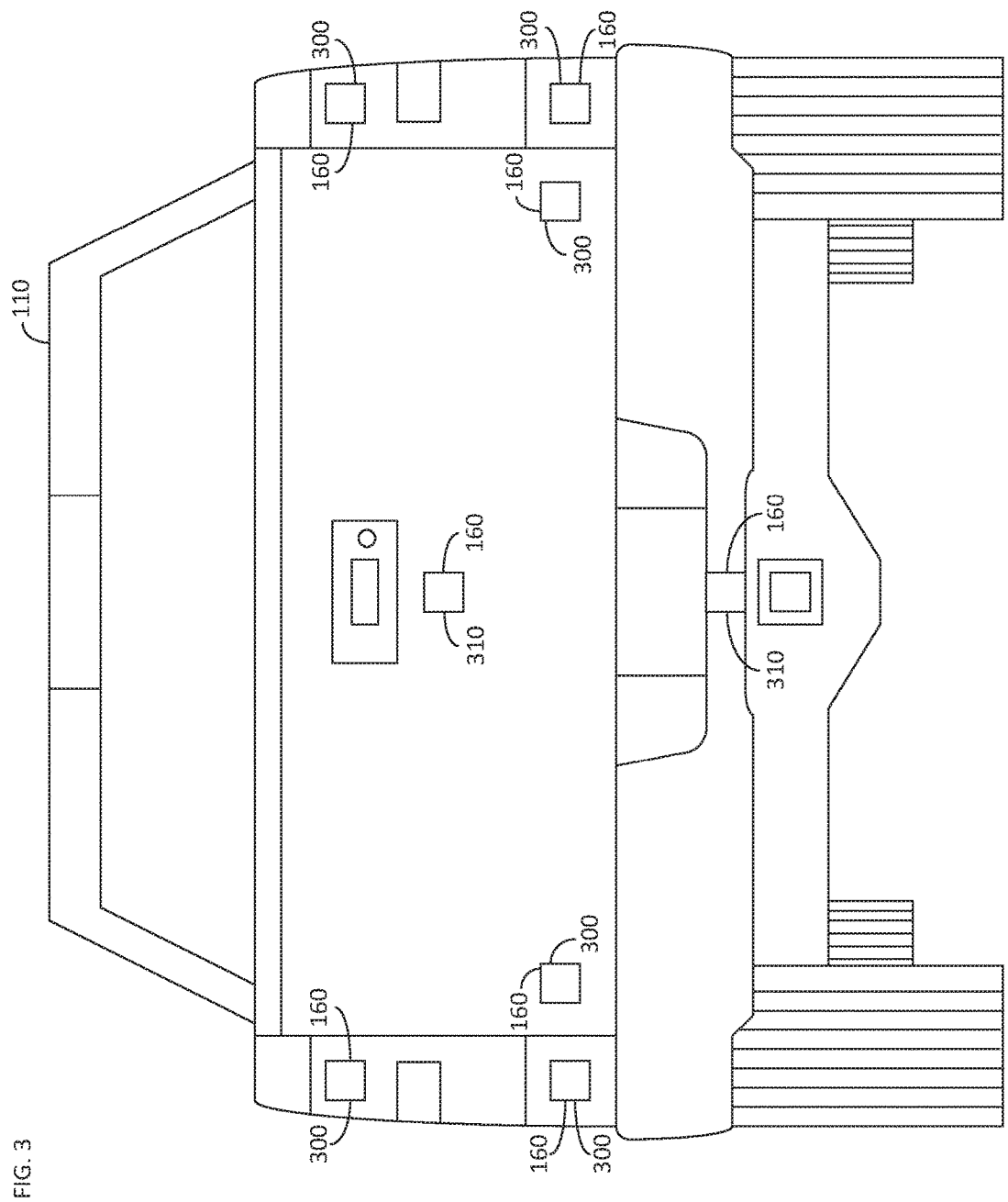
FIG. 3 is a line drawing of a rear end of another exemplary vehicle, in accordance with an embodiment.

In one embodiment, for example, the vehicle 110 may have three RF systems 160 located on the rear side of the vehicle, with two RF systems 160 located on a side of the rear end of the vehicle 110, and one in the center of the rear end of the vehicle, as illustrated in FIG. 2. However, the specific position of the RF sensors 160 can vary. FIG. 3 is a line drawing of a rear end of an exemplary vehicle 110, in accordance with an embodiment. FIG. 3 illustrates multiple rear side RF systems 300 and multiple rear center RF systems 310, illustrating some other exemplary side positions where the RF systems 160 may be installed.

Figure 4:
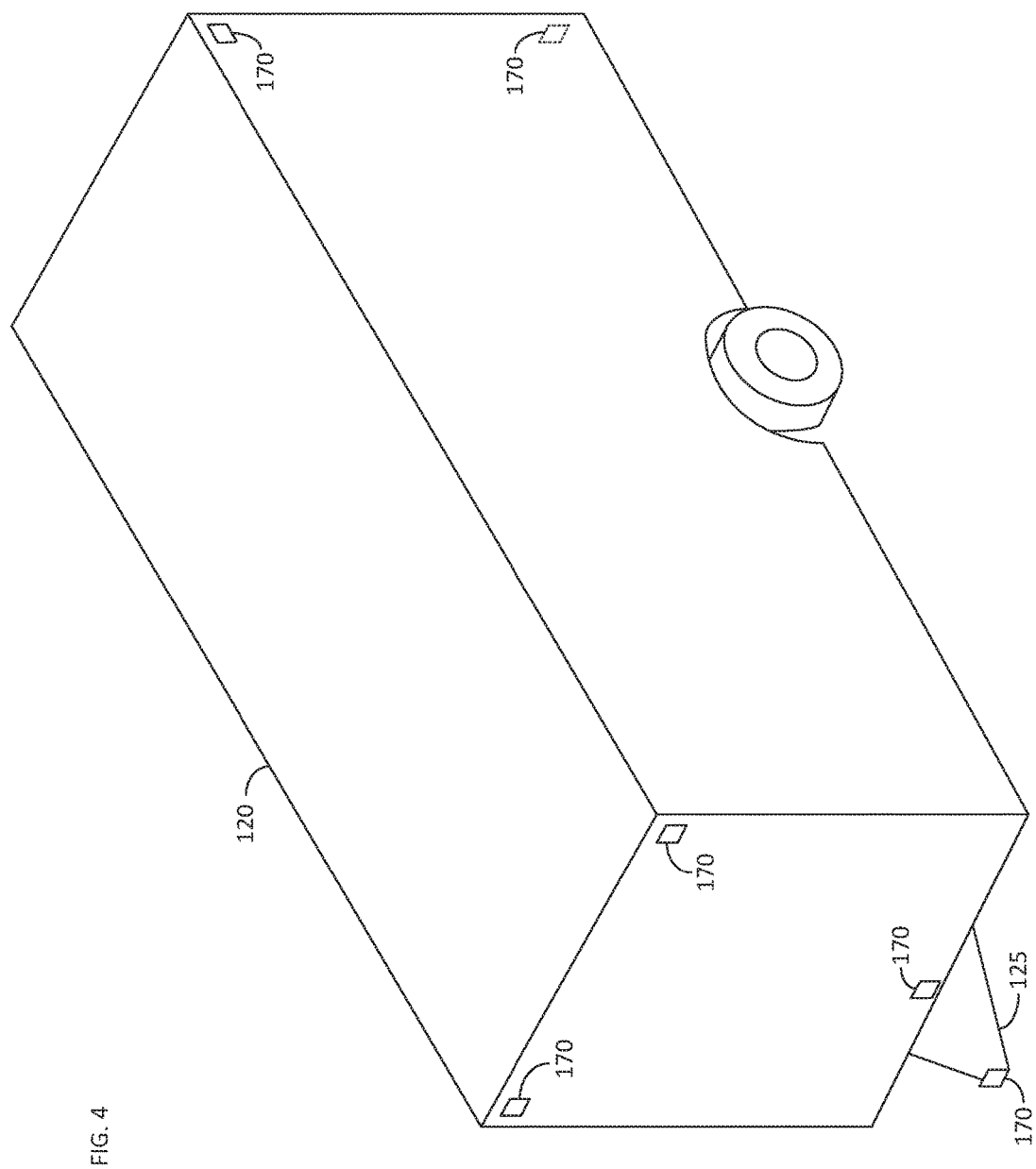
FIG. 4 is a line drawing of a perspective view of an exemplary trailer, in accordance with an embodiment.

FIG. 4 is a line drawing of a perspective view of an exemplary trailer 120, in accordance with an embodiment. As seen in FIG. 4, the RF systems 170 could be located in a variety of locations, depending upon the purpose of the respective RF system 170 and the features desired. For example, in one embodiment, only a single RF system 170 could be located on trailer 120 on the trailer coupler 125. As discussed above, having a single RF system 170 on the trailer coupler 125, in combination with multiple RF systems 160 on the vehicle 110, would allow the processor 130 and vehicle 110 to perform automated hitching alignment, discussed in further detail below. However, in other embodiments, multiple RF systems 170 can be placed in various locations around the trailer 110. Having multiple RF systems 170 can improve the accuracy of the automated hitching alignment by providing ranging data, azimuth data and trailer orientation data.

The RF system(s) 170 may be permanently attached to the trailer 120 or the RF system(s) 170 may be temporarily attached or placed near the trailer 120. For example, an RF system, 170 may be magnetically coupled to the trailer 120 or otherwise attached in any temporary manner. As discussed in further detail below, having multiple RF systems 170 located on the trailer can allow the processor 130 to automatically determine one or more dimension of the trailer 120. For example, having two RF systems 170, one located on a lower portion of the trailer 120 and one on an upper portion, can allow the processor 130 to determine the height of the trailer 120. The height data can be used, for example, by the processor 130 or another system in the vehicle to verify that the trailer can, for example, fit under an overpass or avoid other obstacles such as trees, telephone wires, street signs, or the like. Likewise, having two RF systems 170, one located on a left side of the trailer 120 and one on a left side of the trailer 120, can allow the processor to determine the width of the trailer 120. The width data may also be used for stability and control systems once the trailer 120 is hitched to the vehicle 110. Likewise, having two RF systems 170, one located on a front of the trailer 120 and one on a back of the trailer 120, can allow the processor to determine the length of the trailer 120. The combination of the length, width and height of the trailer may be used by the processor 130, or another system of the vehicle, to assist in any system related to stability and control of the trailer 120 once hitched to the vehicle 110. The number of RF systems 170 arranged on the trailer 120, and their respective placement, can vary depending upon the desired features, that is, automated hitching alignment, width determination, height determination, length determination, or any combination thereof. Alternatively, as discussed above, one or more mobile RF sensors 170 may be temporarily attached to the trailer 120 to determine the respective dimensions of the trailer 120. By utilizing one or more mobile RF sensors 170, which are temporarily attached or held near a respective corner of the trailer 120, the processor 130 can determine the dimensions of any trailer without having to permanently install the RF systems thereon. Likewise, the processor 130 can perform the automated hitching utilizing the mobile RF sensor(s) 170.

A total number of combined RF systems 160 and 170 in the system 100 is preferably greater than or equal to three for the purposes of automatically moving the vehicle 110 into position to be hitched to the trailer 120, as three points allow for triangulation calculations, as discussed in further detail below. In one embodiment with three total RF systems 160 and 170, the system may include two RF systems 160 on the bumper of the vehicle and one RF system 170 may be located on the trailer coupler 125. In another embodiment, for example, two RF systems 170 may be located on a front of the trailer 120 and one RF system 160 may be located on the vehicle hitch 115. However, more RF systems 160 or 170 placed on the respective vehicle 110 or trailer 120, give more data points, thereby improving the accuracy of the system 100. For example, having four RF sensors 160 and 170 in total would allow the processor 130 to calculate a relative azimuth of all of the sensors allowing for both ranging and azimuth calculations when the RF sensors 170 are along the same plane and a relative height of the RF sensors 170 and 160 are known. In contrast, only having three RF sensors 160 and 170 in total would only allow for ranging calculations and a user may have to manually enter height information of any RF sensor 170 on the trailer into the system to more accurately perform the automated hitching or trailer dimensioning.

In one embodiment, for example, the location of the RF systems 160 may be stored in the memory 150. The location data may be stored in the memory 150 by, for example, the vehicle manufacturer when the RF systems 160 are installed when the vehicle 110 is being built. However, the location data may be added to the memory 150 at a later time. For example, one or more of the RF systems 160 may be added as an aftermarket product. In these embodiments, the location data may be generated by using a mobile RF system 170 placed on the hitch 115 of the vehicle 110. In this embodiment, for example, the processor 130 would determine a relative location of the aftermarket RF systems 160 utilizing a similar ranging processes, as discussed in further detail below. Alternatively, a user could measure the distance between each aftermarket RF system 160 and the vehicle hitch 115 and enter the distances in each plane into the system using an element of the user interface 195. If a user manually hitches the vehicle 110 to the trailer 120, the processor 130 could determine the location of the trailer coupler 125 relative to the location of the RF sensors 170 and store the respective locations in the memory for future automated hitching operations.

Each RF system 170 may have a unique identifier associated therewith. The unique identifier may be associated with a location on the trailer 120 relative to the trailer coupler 125 by the user using the user interface 195. In this manner, the processor 130 can identify an orientation of the trailer 120, when more than one RF system 170 is used, and can properly identify the location of the trailer coupler 125 for the automated hitching process, as discussed in further detail below.

Returning to FIG. 1, in one embodiment, for example, the RF system 160 of the vehicle 110 may include another transceiver (not illustrated), such as a Bluetooth transceiver, a Wi-Fi transceiver, a ZigBee transceiver, or the like or any combination thereof. In this embodiment, the ultra-wide band 162 transceiver may be utilized to exchange data with the RF system 170 of the trailer 120 and the other transceiver may be used to wirelessly communicate with the processor 130, which would be connected to another. However, in other embodiments, each RF system 160 may be communicatively connected to the processor via a wired data bus. Any combination of wired or wireless systems may be used to connect the RF system(s) 160 to the processor 130.

The RF system(s) 170 of the trailer 120 further includes a processor 174. The processor 174 may be a central processing unit (CPU), a graphics processing unit (GPU), a physics processing unit (PPU), a microcontroller, an field programmable gate array (FPGA), an application specific integrated circuit (ASIC), or any other logic device, or any combination thereof. The processor 174 controls the RF system 170 of the trailer 120, as discussed in further detail below.

The RF system(s) 170 of the trailer 120 further includes a power system 176. The power system 176 may include a battery powered system. The battery power system allows the RF system(s) of the trailer 120 to operate when the trailer 120 is not connected to the vehicle 110. The power system 176 of the trailer may also be capable of receiving power from a power system 180 of the vehicle 110 when the trailer 120 is hitched to the vehicle 110. Trailer's 120 often receive power from a vehicle 110 through a harness (not illustrated) in order to power brake lights on the trailer. Accordingly, the RF system 170 of the trailer 120 may utilize this power source when the trailer 120 is hitched to the vehicle 110 in order to reduce the power consumed by the batteries of the power system 176.

In one embodiment, for example, one or more of the RF systems 170 on the trailer 120 may be connected to one or more data generators 190. The data generators 190 may be, for example, a camera (e.g., backup cameras, side view cameras, or the like), weight sensors, load position sensors, or the like. When there is available bandwidth between the RF systems 160 and the RF systems 170, the RF systems 170 may transmit the data received from the data generator(s) 190 to the processor 130 through the RF systems 160, thereby allowing the data from the data generators 190 to be wirelessly transferred to the vehicle 110.

The vehicle 110 may further include a user interface 195. The user interface 195 may include one or more buttons, a display, a touchscreen, a knob, a joystick, a mouse, a microphone, or the like, or any combination thereof. The user interface 195 may be used to initiate the system 100, select a mode of operation for the system 100, and/or display system data, as discussed in further detail below.

Figure 5:
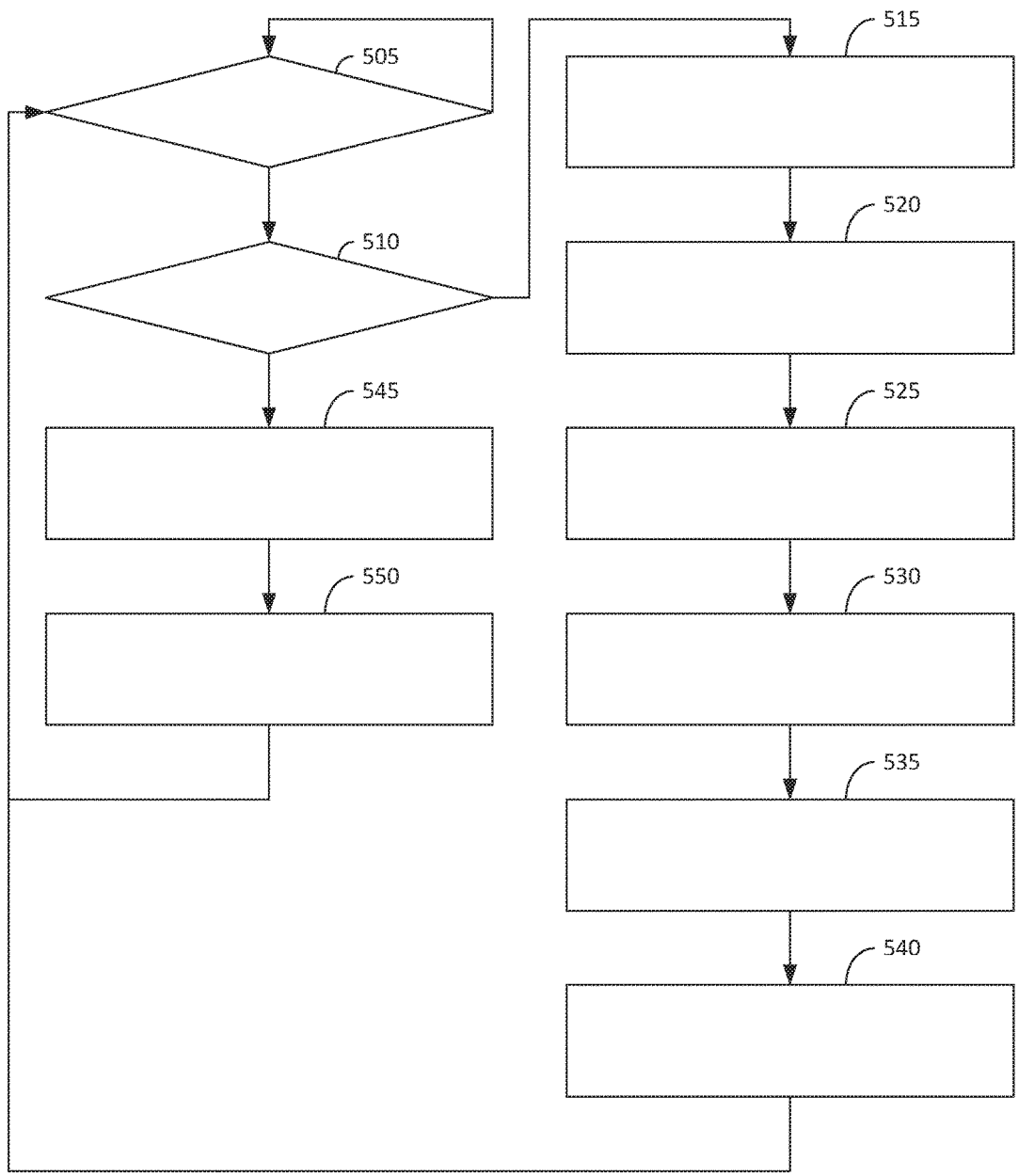
FIG. 5 is a flow chart illustrating an exemplary method for operating the system, in accordance with an embodiment.

FIG. 5 is a flow chart illustrating an exemplary method 500 for operating the system 100, in accordance with an embodiment. The system 100 may be used to perform any one of the automated hitching alignment, the trailer dimensioning, or the data generator 190 data transmitting, or any combination thereof. The processor 130 first determines if the system has been triggered for operation. (Step 505). The system 100 may be triggered, for example, by a user through the user interface 195 or another interface (e.g., a cellular phone or the like), or automatically based upon a user action.

For example, the system 100 may be automatically triggered each time the vehicle gear is switched entered into reverse.

The processor 130 then determines a mode of operation of the system 100. (Step 510). As discussed above, the system 100 may be used to automatically move the vehicle 110, via one or more of the vehicle control systems 140, into a position to hitch the vehicle 110 to the trailer 120, to automatically determine the dimensions of the trailer 120, or to transmit data from a data generator 190 from the trailer 120 to the vehicle 110. In one embodiment, for example, a user can chose a mode of operation via the user interface 195. For example, one or more hard or soft buttons, knobs, or the like can be utilized to choose an operational mode of the system 100. The processor 130 may alternatively, or in combination with the manual mode selection, automatically determine a mode of operation for the system 100 without user input. For example, if the processor 130 determines that one or more RF systems 170 of the trailer are transmitting non-location based packets (i.e., data from a data generator rather than data in response to a data packet from an RF system 160), the processor 130 may automatically select a data transition mode. As another example, if the processor 130 determines that the harness to the trailer is not connected, the processor 130 may automatically select the autonomous hitching mode.

When the autonomous hitching mode or trailer dimensioning mode are selected, the processor 130 then generates a data packet to be sent by each RF system 160 on the vehicle. (Step 515). Each data packet includes a unique identification code associated with a respective RF system 160. The unique identification codes are used to track responses from the RF systems 170. The unique ID may be assigned by the processor 130 or may be built into the transceiver of the RF system 160 or 170. Each unique ID is associated with the location of a respective RF system 160, relative to a location on the vehicle 100, or a respective location of a RF system 170, relative to a location on the trailer 120.

The processor then 130 generates instructions causing the RF systems 160 on the vehicle to transmit the data packet. (Step 520). In one embodiment, for example, each RF system 160 may take turns conducting the ranging measurements. By only having one RF system 160 transmit the data packet at a time, each other RF system 160 or 170 can respond as quickly as possible (i.e., the other RF systems won't be processing other requests), thereby increasing the accuracy of the time-of-flight ranging measurements, as discussed in more detail below.

The processor 174 of the RF systems 170 receive the packet sent by a RF system 160 and retransmits the packet along with unique ID of the respective RF system 170 for receipt by the RF system(s) 160. (Step 525). The data packets are retransmitted with a unique ID corresponding to each RF system 170 so that data corresponding to the same RF system 170 received by different RF systems 160 can be used to triangulate the position of the RF system 170. The respective positions, and distances there between, of any of the RF systems 160 on the vehicle 110 may be stored in the memory 150. However, the RF systems 160 could also respond to data packets received from other RF systems 160 in a similar manner as the RF systems 170 to determine the relative locations between the RF systems 160.

A processor then processes the data received at each RF system 160 to determine the distance between each of the RF systems 170 relative to the RF systems 160. (Step 530). In one embodiment, for example, the processor 130 may perform all of the processing. However, in another embodiment, for example, each RF system 160 may have an internal processor, similar to the processor 174 of the RF systems 170. In this embodiment, for example, the processor of the RF system 160 may determine the distance between the respective RF system 160 and each RF system 170 and transmit the distances to the processor 130 for subsequent processing. In either embodiment, the distance between each respective RF system 160 and 170 is determined based upon a time in flight of the transmitted data packets. In one embodiment, for example, the data packet may be sent in Step 420 with a time stamp. In another embodiment, for example, the processor may store a timestamp in the memory 150. However, any combination of timestamp mechanism may be used. The processor determines the distance between each RF system 160 and 170 based upon a time-in-flight, in other words, the difference in time between when the packet was sent by the RF system 160 and when the packet was returned by the corresponding RF system 170.

The processor 130 then determines the position of each RF system 170 based upon the determined distances between each RF system 160 and each RF system 170. (Step 535). By determining the position of each RF system 170, the processor 130 is able to perform the automated hitching alignment, determine the dimension of a trailer, or both, as discussed in further detail below. In one embodiment, for example, the processor 130 may determine the position of each RF system 170 via triangulation.

Figure 6:
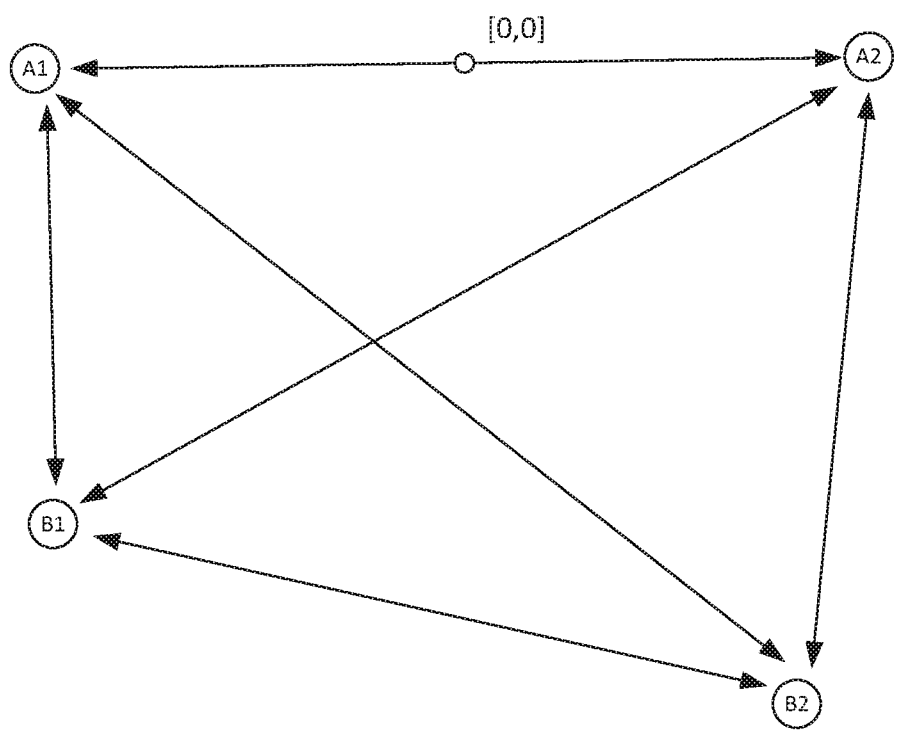
FIG. 6 illustrates data in a Cartesian coordinate system to help explain how the processor determines the positions of each RF system, in accordance with an embodiment.

FIG. 6 illustrates data in a Cartesian coordinate system to help explain how the processor determines the positions of each RF system 160 and each RF system 170, in accordance with an embodiment. As seen in FIG. 6, two RF systems 160, labeled A1 and A2, and two RF systems 170, labeled B1 and B2, are installed in the vehicle 110 and trailer 120, respectively. In this example, the processer 130 first determines an origin for a frame of reference for the position calculations. The origin, for example, could be the location of one of the RF systems 160 on the vehicle 110. However, the location of any of the RF systems 160 or 170 could be used as the origin point for the purposes of the position calculations. In another embodiment, and as illustrated in FIG. 6, the origin for the frame of reference could be set to be in the middle of the RF system A1 and A1 on the vehicle 110. In yet another embodiment, the origin may be a location of the vehicle hitch 115. However, the origin for the frame of reference could be set to be anywhere in the middle of two or more RF systems 160 and 170. In another embodiment, for example, the origin can be preselected and saved on the memory 150.

The selection origin affects the triangulation calculations. For example, with the origin between RF systems A1 and A2 as seen in FIG. 6, the processor 130 calculates the position of RF systems A1 and A2 according to $P_{A1}=(-D_{A1A2}/2, 0)$ and $P_{A2}=(D_{A1A2}/2, 0)$, where $P_{A1}$ corresponds to the position of RF system A1, $P_{A2}$ corresponds to the position of RF system A2 and $D_{A1A2}$ corresponds to the distance between RF system A1 and RF system A2. In this embodiment, the angle between RF system A1 and RF system B1 $\theta_{A1B1}$ may be determined according to:

$$\theta_{A1B1} = \mathrm{acos}\left(\frac{D^2_{A1A2} + D^2_{A1B1} - D^2_{A2B1}}{2 \times D_{A1A2} \times D_{A1B1}}\right)$$

In this embodiment, the angle between RF system A1 and RF system B2 $\theta_{A1B2}$ may be determined according to:

$$\theta_{A1B2} = \operatorname{acos}\left(\frac{D_{A1A2}^2 + D_{A1B2}^2 - D_{A2B2}^2}{2 \times D_{A1A2} \times D_{A1B2}}\right)$$

Where $D_{xy}$ represents the distance between the named RF systems calculated by the processor 130 in Step 430. With the distances between the respective points and the angles therebetween, the processor can calculate the position of RF system B1 ($P_{B1}$) and the position of RF system B2 ($P_{B2}$) according to:

$$P_{B1} = P_{A1} + D_{A1B1}(\cos(\theta_{A1B1}), \sin(\theta_{A1B1}))$$

$$P_{B2} = P_{A1} + D_{A1B2}(\cos(\theta_{A1B2}), \sin(\theta_{A1B2}))$$

The example set forth in FIG. 6, and the equations above, are merely exemplary in nature as the selected origin as well as the number of dimensions and the number of RF systems 160 and 170 may vary (e.g., two dimensional equations are only needed when the RF systems 160 and 170 are the same elevation above the ground and three-dimensional equations would be used when the elevation of the RF systems 160 or 170 varies).

Returning to FIG. 5, the processor 130 then, depending upon the mode of operation of the system 100, determines one of an automated hitching alignment, a trailer dimension, or both the automated hitching alignment and the trailer dimension. (Step 540). In the case of the trailer dimensioning, the processor 130 utilizes the determined position of the RF system(s) 170 on the trailer 120 to determine the dimensions of the trailer.

When the system 100 is operating in the automated hitching alignment mode, the processor determines control commands for the vehicle control system(s) 140 to align the vehicle hitch 115 with the trailer coupler 125 based upon the relative locations of the vehicle hitch 115 and the trailer coupler 125. Once the position of the trailer coupler 125 is determined, the processor 130 generates commands to the control systems 140 to move the vehicle into position such that the vehicle hitch 115 is aligned with the trailer coupler 125. The processor 130 generates instructions to move the vehicle 110 based on the relative location and position of the trailer 120 and continues to conduct measurements constantly. The processor 130 controls a speed of the vehicle 110, especially in close range, to enable the collection of sufficient measurements to ensure high accuracy. In another embodiment, for example, the processor 130 may generate commands for the user to implement to align the vehicle hitch 115 with the trailer coupler 125 based upon the relative locations of the vehicle hitch 115 and the trailer coupler 125. The generated commands may be displayed, for example, on a display of the user interface 195. The generated commands could include, for example, steering wheel angles, distances to travel and the like, which when executed by the user, align the vehicle hitch 115 with the trailer coupler 125. In either embodiment, the processor 130 continuously updates the vehicle control commands or user commands (i.e., the processor 130 goes through the steps of the method 500 multiple times) as the vehicle 110 progresses towards the desired location.

The processor 130, after executing the automatic hitching and/or trailer dimensioning, then returns to Step 505 to await the next trigger event.

When the processer 130 determines that the system is in a data transmission mode in Step 410, the processor 130 initiates the data transmission if the data generator(s) 150 and RF system(s) 170 are not already transmitting the data.

(Step 545). For example, the processor 130 can send an initiation request to the data generator(s) 150 through one or more RF systems 160 and 170. The data generator(s) 150 then begin to transmit the data through one or more RF system(s) 170 to the processor 130 through one or more RF systems 160.

The processor 130 then processes the data and may execute one or more actions depending upon the data received and the data generator type. (Step 550). For example, if the data generator 190 is a back-up camera, the processor 30 may generate instructions to display the camera data on a display within the vehicle 110. The processor 130 could also process the camera data to determine, for example, if there are any pedestrians or other objects behind the trailer 120. In one embodiment, for example, the processor 130 could implement an invisible trailer system utilizing data from one or more cameras installed on the trailer 120. In other words, the processor 130 could stitch together image data from one or more cameras to present an image to the user on a display within the vehicle 110 as if the trailer were invisible, giving the user a better appreciation of what is behind the vehicle 110.

While at least one exemplary aspect has been presented in the foregoing detailed description of the invention, it should be appreciated that a vast number of variations exist. It should also be appreciated that the exemplary aspect or exemplary aspects are only examples, and are not intended to limit the scope, applicability, or configuration of the invention in any way. Rather, the foregoing detailed description will provide those skilled in the art with a convenient road map for implementing an exemplary aspect of the invention. It being understood that various changes may be made in the function and arrangement of elements described in an exemplary aspect without departing from the scope of the invention as set forth in the appended claims.

What is claimed is:

1. A vehicle, comprising:
a vehicle hitch;
at least one vehicle control system;
at least one vehicle radio frequency system comprising a transceiver;
a processor communicatively coupled to the at least one vehicle radio frequency system and the at least one vehicle control system, the processor configured to:
generate a unique data packet for each of the at least one vehicle radio frequency system;
generate an instruction for each of the at least one vehicle radio frequency system to transmit the unique packet associated with the respective at least one vehicle radio frequency system;
receive, from each of the at least one vehicle radio frequency system, a distance between a corresponding receiving one of the at least one vehicle radio frequency system and a corresponding transmitting one of at least one trailer radio frequency systems based upon a time in flight of the corresponding transmitted unique packet and a corresponding response packet transmitted by the respective trailer radio frequency system;
determine a relative physical position of each of the at least one vehicle radio frequency system and each of the at least one trailer radio frequency system based upon the determined distance;
determine, based upon the determined relative physical position of each of the at least one vehicle radio frequency system and each of the at least one trailer radio frequency system, dimensions of the trailer;

determine a physical position of the vehicle hitch relative to a trailer coupler based upon the determined relative physical position of each of the at least one vehicle radio frequency system and each of the at least one trailer radio frequency system; and
generate instructions for the at least one vehicle control system to cause the vehicle to move to align the vehicle hitch with a trailer coupler of the trailer.

2. The vehicle of claim 1, wherein the transceiver is an ultra-wideband transceiver.

3. The vehicle of claim 1, wherein the vehicle includes at least two vehicle radio frequency systems,
wherein the processor is further configured to determine the relative physical position of each of the at least two vehicle radio frequency systems and each of the at least one trailer radio frequency system by triangulating the position of the least one trailer radio frequency system relative to the at least two vehicle radio frequency systems.

4. The vehicle of claim 1, further comprising a user interface, the user interface comprising a display, wherein the processor is further configured to:
receive, from the at least one vehicle radio frequency system, camera data from the at least one trailer radio frequency system; and
generate instructions for the user interface to display the camera data on the display of the user interface.

5. A vehicle, comprising:
at least one vehicle radio frequency system comprising a transceiver;
a processor communicatively coupled to the at least one vehicle radio frequency system, the processor configured to:
generate a unique data packet for each of the at least one vehicle radio frequency system;
generate an instruction for each of the at least one vehicle radio frequency system to transmit the unique packet associated with the respective at least one vehicle radio frequency system;
receive, from each of the at least one vehicle radio frequency system, at least one response packet transmitted from at least one trailer radio frequency system corresponding to a trailer;
determine, for each received response packet, a distance between a corresponding receiving one of the at least one vehicle radio frequency system and a corresponding transmitting one of the at least one trailer radio frequency systems based upon a time in flight of the corresponding transmitted unique packet and the corresponding response packet;
determine a relative physical position of each of the at least one vehicle radio frequency system and each of the at least one trailer radio frequency system based upon the determined distance; and
determine, based upon the determined relative physical position of each of the at least one vehicle radio frequency system and each of the at least one trailer radio frequency system, dimensions of the trailer.

6. The vehicle of claim 5, comprising:
a vehicle hitch; and
at least one vehicle control system communicatively coupled to the processor,
wherein the processor is further configured to:
determine a physical position of the vehicle hitch relative to each of the at least one vehicle radio frequency system and each of the at least one trailer radio frequency system; and
generate instructions for the at least one vehicle control system to cause the vehicle to move to align the vehicle hitch with a trailer coupler of the trailer.

7. The vehicle of claim 6, wherein the instructions are displayed to a user on a display.

8. The vehicle of claim 6, wherein the instructions cause a control system of the vehicle to automatically move the vehicle.

9. The vehicle of claim 5, wherein the vehicle includes at least two vehicle radio frequency systems,
wherein the processor is further configured to determine the relative physical position of each of the at least two vehicle radio frequency systems and each of the at least one trailer radio frequency system by triangulating the position of the least one trailer radio frequency system relative to the at least two vehicle radio frequency systems.

10. The vehicle of claim 5, further comprising a user interface, the user interface comprising a display, wherein the processor is further configured to:
receive, from the at least one vehicle radio frequency system, camera data from the at least one trailer radio frequency system; and
generate instructions for the user interface to display the camera data on the display of the user interface.

11. A wireless vehicle-trailer interface system for communication between a vehicle and a trailer, the wireless vehicle-trailer interface system comprising:
a vehicle hitch;
at least one vehicle control system;
at least one vehicle radio frequency system comprising a first transceiver;
a first processor communicatively coupled to the at least one vehicle radio frequency system and the at least one vehicle control system, the first processor configured to:
generate a unique data packet for each of the at least one vehicle radio frequency system;
generate an instruction for each of the at least one vehicle radio frequency system to transmit the unique packet associated with the respective at least one vehicle radio frequency system;
receive, from each of the at least one vehicle radio frequency system, at least one response packet transmitted from at least one trailer radio frequency system corresponding to a trailer;
determine, for each received response packet, a distance between a corresponding receiving one of the at least one vehicle radio frequency system and a corresponding transmitting one of the at least one trailer radio frequency systems based upon a time in flight of the corresponding transmitted unique packet and the corresponding response packet;
determine a relative physical position of each of the at least one vehicle radio frequency system and each of the at least one trailer radio frequency system based upon the determined distance;
determine, based upon the determined relative physical position of each of the at least one vehicle radio frequency system and each of the at least one trailer radio frequency system, dimensions of the trailer;
determine a physical position of the vehicle hitch relative to each of the at least one vehicle radio frequency system and each of the at least one trailer radio frequency system; and generate instructions for the at least one vehicle control system to cause the vehicle to move to align the vehicle hitch with a trailer coupler of the trailer.

12. The wireless vehicle-trailer interface system of claim 11, wherein the vehicle includes at least two vehicle radio frequency systems,
wherein the first processor is further configured to determine the relative physical position of each of the at least two vehicle radio frequency systems and each of the at least one trailer radio frequency system by triangulating the position of the least one trailer radio frequency system relative to the at least two vehicle radio frequency systems.

13. The wireless vehicle-trailer interface system of claim 11, further comprising a user interface, the user interface comprising a display, wherein the first processor is further configured to:
receive, from the at least one vehicle radio frequency system, camera data from the at least one trailer radio frequency system; and
generate instructions for the user interface to display the camera data on the display of the user interface.

14. The wireless vehicle-trailer interface system of claim 11, wherein each of the at least one trailer radio frequency system comprises:
a second transceiver; and
a second processor communicatively coupled to the second transceiver, wherein the second processor is configured to:
receive, from the second transceiver, the unique data packet from each of the at least one vehicle radio frequency system; and
generate instructions for the second transceiver to transmit the response packet in response to each unique data packet from each of the at least one vehicle radio frequency system.

15. The wireless vehicle-trailer interface system of claim 14, wherein the response packet comprises a corresponding unique packet and a unique identifier associated with a respective at least one trailer radio frequency system.

16. The wireless vehicle-trailer interface system of claim 14, wherein each of the at least one trailer radio frequency system further comprises a trailer power system configured to power the second transceiver and the second processor.

17. The wireless vehicle-trailer interface system of claim 16, wherein the trailer power system comprises a battery.

18. The wireless vehicle-trailer interface system of claim 11, wherein the vehicle radio frequency system comprises a second transceiver communicatively coupled between the first transceiver and the processor, wherein the second transceiver exchanges communications between the processor and the first transceiver.

19. The wireless vehicle-trailer interface system of claim 11, wherein at least one of the at least one vehicle radio frequency system is embedded within a bumper of the vehicle.

* * * * *